US00RE40683E

(19) United States
(12) Reissued Patent
Perkins

(10) Patent Number: US RE40,683 E
(45) Date of Reissued Patent: Mar. 24, 2009

(54) PROCESS FOR MAINTAINING ONGOING REGISTRATION FOR PAGES ON A GIVEN SEARCH ENGINE

(75) Inventor: Alan Perkins, Kettering (GB)

(73) Assignee: Search Mechanics, Inc., New York, NY (US)

(21) Appl. No.: 10/600,114

(22) Filed: Jun. 20, 2003

Related U.S. Patent Documents

Reissue of:
(64) Patent No.: 6,253,198
Issued: Jun. 26, 2001
Appl. No.: 09/309,681
Filed: May 11, 1999

(51) Int. Cl.
*G06F 17/30* (2006.01)

(52) U.S. Cl. ..... 707/3; 707/9; 707/10; 707/104.01; 709/203; 709/218; 715/201; 715/209; 715/234

(58) Field of Classification Search ..... 707/2, 707/3, 4, 9, 10, 102, 104.1; 709/203, 218; 715/201, 209, 234
See application file for complete search history.

(56) References Cited

U.S. PATENT DOCUMENTS 5,089,956 A * 2/1992 MacPhail ..... 707/1
5,247,661 A * 9/1993 Hager et al. ..... 707/104.1
5,262,942 A * 11/1993 Earle ..... 705/37
5,265,242 A * 11/1993 Fujisawa et al. ..... 707/3
5,285,383 A * 2/1994 Lindsey et al. ..... 705/26
5,297,031 A * 3/1994 Gutterman et al. ..... 705/37
5,297,032 A * 3/1994 Trojan et al. ..... 705/37
5,301,350 A * 4/1994 Rogan et al. ..... 705/33
5,321,750 A * 6/1994 Nadan ..... 380/230
5,410,693 A * 4/1995 Yu et al. ..... 707/100
5,537,586 A * 7/1996 Amram et al. ..... 707/3
5,721,908 A * 2/1998 Lagarde et al. ..... 707/10
5,745,899 A * 4/1998 Burrows ..... 707/102
5,778,367 A * 7/1998 Wesinger et al. ..... 707/10
5,790,793 A * 8/1998 Higley ..... 709/218
5,819,271 A * 10/1998 Mahoney et al. ..... 707/9
5,835,712 A * 11/1998 DuFresne ..... 709/203
5,835,718 A * 11/1998 Blewett ..... 709/218

(Continued)

FOREIGN PATENT DOCUMENTS

WO WO9323836 * 11/1993
WO WO 9608108 * 3/1996
WO WO 9837697 * 8/1998

*Primary Examiner*—Shahid A Alam
(74) *Attorney, Agent, or Firm*—Kenneth A. Roddy

(57) ABSTRACT

A process for maintaining ongoing registration for pages on a given search engine is disclosed. It is a method to actively cause an updating of a specific Internet search engine database regarding a particular WWW resource. The updated information can encompass changed, added, or deleted content of a specific WWW site. The process comprises the steps of having software tools at a local WWW site manually and/or automatically keep an index of added, changed, or deleted content to a particular WWW site since that WWW site was last indexed by a specific Internet search engine. The software tools will notify a specific Internet search engine of the URLs of specific WWW site resources that have been added, changed, or deleted. The Internet search engine will process the list of indices of changes, additions or deletions provided by a web site, or add the URL of resources that require indexing or re-indexing to a database and visit the WWW site to index added or re-index changed content when possible. The benefit to the Internet is the creation of an exception-based, distributed updating system to the Internet search engine as opposed to the cyclical and repetitive inquiring by the Internet search engine to visit all WWW sites to find added, changed, or deleted content. Overall Internet transmissions are reduced by distributing the update and indexing functions locally to web sites and away from the central Internet search engine.

14 Claims, 6 Drawing Sheets

U.S. PATENT DOCUMENTS 5,848,410 A * 12/1998 Walls et al. ..... 707/4
5,852,820 A * 12/1998 Burrows ..... 707/2
5,859,971 A * 1/1999 Bittinger et al. ..... 709/203
5,864,871 A * 1/1999 Kitain et al. ..... 707/104.1
5,873,077 A * 2/1999 Kanoh et al. ..... 707/3
5,890,172 A * 3/1999 Borman et al. ..... 715/205
5,933,829 A * 8/1999 Durst et al. ..... 707/10
5,956,716 A * 9/1999 Kenner et al. ..... 707/10
5,983,214 A * 11/1999 Lang et al. ..... 707/1
5,987,464 A * 11/1999 Schneider ..... 707/10
5,987,480 A * 11/1999 Donohue et al. ..... 715/207
6,055,538 A * 4/2000 Kessenich et al. ..... 707/101
6,078,917 A * 6/2000 Paulsen et al. ..... 707/6
6,094,649 A * 7/2000 Bowen et al. ..... 707/3
6,105,021 A * 8/2000 Berstis ..... 707/3
6,169,992 B1 * 1/2001 Beall et al. ..... 707/103 R

* cited by examiner

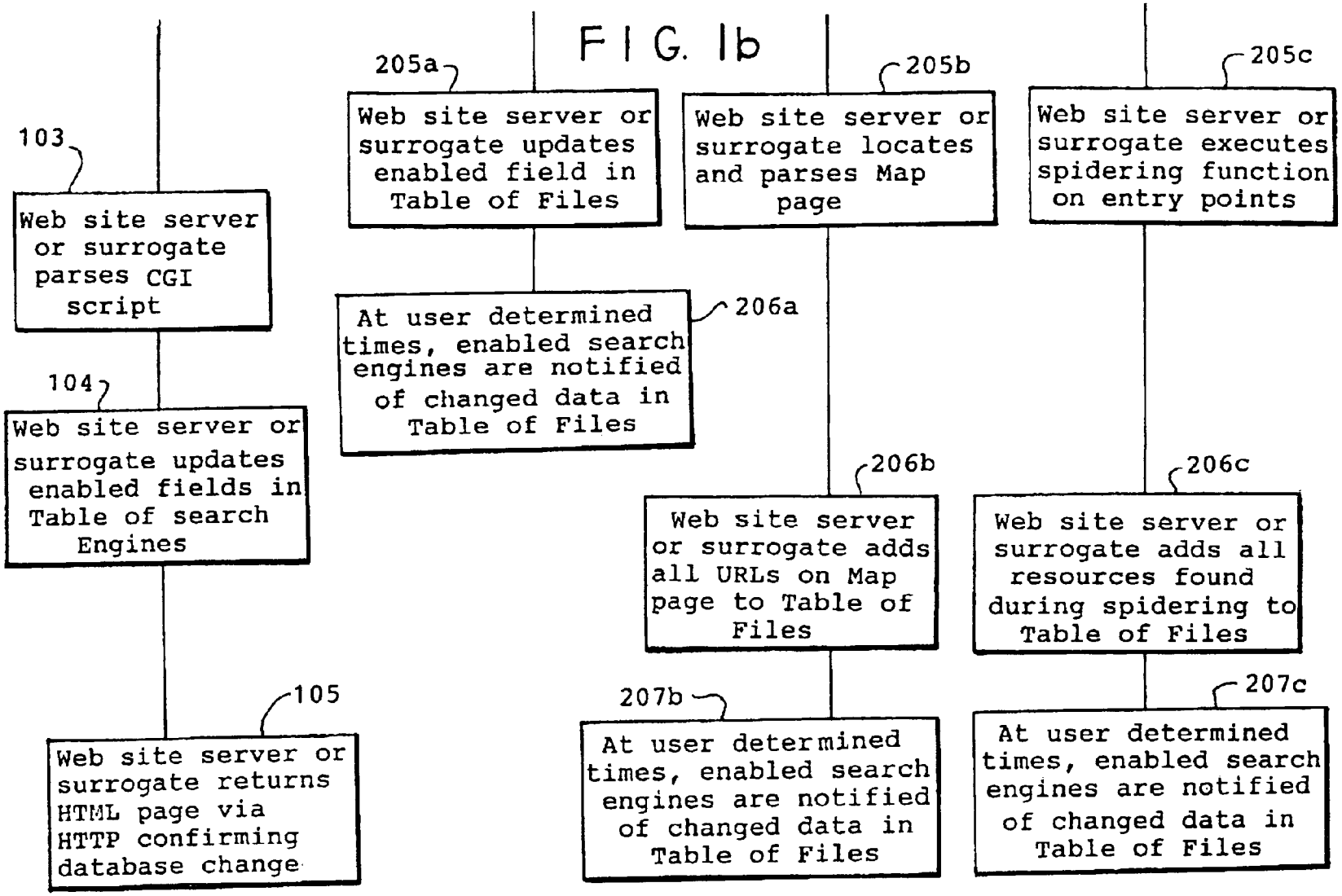
FIG. 1b
103
Web site server or surrogate parses CGI script
104
Web site server or surrogate updates enabled fields in Table of Engines
105
Web site server or surrogate returns HTML page via HTTP confirming database change
205a
Web site server or surrogate updates enabled field in Table of Files
206a
At user determined times, enabled search engines are notified of changed data in Table of Files
205b
Web site server or surrogate locates and parses Map page
206b
Web site server or surrogate adds all URLs on Map page to Table of Files
207b
At user determined times, enabled search engines are notified of changed data in Table of Files
205c
Web site server or surrogate executes spidering function on entry points
206c
Web site server or surrogate adds all resources found during spidering to Table of Files
207c
At user determined times, enabled search engines are notified of changed data in Table of Files Y
An entry for the resource is removed from the search engine database
106
Has the resource been registerd by search engine?
107
N
An entry for the resource is added to the search engine database
108
Y
Has the resource changed since it was last indexed?
109
Y
The resource entry in the search engine database is updated
110
N
No Action Taken
111

PROCESS FOR MAINTAINING ONGOING REGISTRATION FOR PAGES ON A GIVEN SEARCH ENGINE

Matter enclosed in heavy brackets [ ] appears in the original patent but forms no part of this reissue specification; matter printed in italics indicates the additions made by reissue.

FIELD OF THE INVENTION

The present invention relates to the process of developing and maintaining the content of Internet search engine databases.

BACKGROUND OF THE INVENTION

An internet (including, but not limited to, the Internet, intranets, extranets and similar networks), is a network of computers, with each computer being identified by a unique address. The addresses are logically subdivided into domains or domain names (e.g. ibm.com, pbs.org, and oranda.net) which allow a user to reference the various addresses. A web, (including, but not limited to, the World Wide Web (WWW)) is a group of these computers accessible to each other via common communication protocols, or languages, including but not limited to Hypertext Transfer Protocol (HTTP). Resources on the computers in each domain are identified with unique addresses called Uniform Resource Locator (URL) addresses (e.g.http://www.ibm.com/products/laptops.htm). A web site is any destination on a web. It can be an entire individual domain, multiple domains, or even a single URL.

Resources can be of many types. Resources with a ".htm" or."html" URL suffix are text files, or pages, formatted in a specific manner called Hypertext Markup Language (HTML). HTML is a collection of tags used to mark blocks of text and assign meaning to them. A specialized computer application called a browser can decode the HTML files and display the information contained within. A hyperlink is a navigable reference in any resource to another resource on the internet.

An internet Search Engine is a web application consisting of

1. Programs which visit and index the web pages on the internet.
2. A database of pages that have been indexed
3. Mechanisms for a user to search the database of pages.

Agents are programs that can travel over the internet and access remote resources. The internet search engine uses agent programs called Spiders, Robots, or Worms, among other names, to inspect the text of resources on web sites. Navigable references to other web resources contained in a resource are called hyperlinks. The agents can follow these hyperlinks to other resources. The process of following hyperlinks to other resources, which are then indexed, and following the hyperlinks contained within the new resource, is called spidering.

The main purpose of an internet search engine is to provide users the ability to query the database of internet content to find content that is relevant to them. A user can visit the search engine web site with a browser and enter a query into a form (or page), including but not limited to an HTML form, provided for the task. The query may be in several different forms, but most common are words, phrases, or questions. The query data is sent to the search engine through a standard interface, including but not limited to the Common Gateway Interface (CGI). The CGI is a means of passing data between a client, a computer requesting data or processing and a program or script on a server, a computer providing data or processing. The combination of form and script is hereinafter referred to as a script application. The search engine will inspect its database for the URLs of resources most likely to relate to the submitted query. The list of URL results is returned to the user, with the format of the returned list varying from engine to engine. Usually it will consist of ten or more hyperlinks per search engine page, where each hyperlink is described and ranked for relevance by the search engine by means of various information such as the title, summary, language, and age of the resource. The returned hyperlinks are typically sorted by relevance, with the highest rated resources near the top of the list.

The World Wide Web consists of thousands of domains and millions of pages of information. The indexing and cataloging of content on an Internet search engine takes large amounts of processing power and time to perform. With millions of resources on the web, and some of the content on those resources changing rapidly (by the day, or even minute), a single search engine cannot possibly maintain a perfect database of all Internet content. Spiders and other agents are continually indexing and re-indexing WWW content, but a single World Wide Web site may be visited by an agent once, then not be visited again for months as the queue of sites the search engine must index grows. A site owner can speed up the process by manually requesting that resources on a site be re-indexed, but this process can get unwieldy for large web sites and is in fact, a guarantee of nothing.

Many current internet search engines support two methods of controlling the resource files that are added to their database. These are the robots.txt file, which is a site-wide, search engine specific control mechanism, and the ROBOTS META HTML tag which is resource file specific, but not search engine specific. Most internet search engines respect both methods, and will not index a file if robots.txt, ROBOTS META tag, or both informs the internet search engine to not index a resource. The use of robots.txt, the ROBOTS META tag and other methods of index control is advocated for the purposes of the present invention.

Commonly, when an internet search engine agent visits a web site for indexing, it first checks the existence of robots.txt at the top level of the site. If the search agent finds robots.txt, if analyses the contents of the file for records such as:

```
User-agent: *
Disallow: /cgi-bin/SRC
Disallow: /stats
```

The above example would instruct all agents not to index any file in directories names /cgi-bin/SRC or /stats. Each search engine agent has its own agent name. For example, AltaVista (currently the largest Internet search engine) has an agent called Scooter. To allow only AltaVista access to directory lavstuff, the following robots.txt file would be used:

```
User-agent: Scooter
Disallow:
User-agent: *
Disallow: /avstuff
```

The ROBOTS META tag is found in the file itself. When the internet search engine agent indexes the file, it will look for a HTML tag like one of the following:

```
<META NAME="ROBOTS" CONTENT="NOINDEX, NO FOLLOW">
<META NAME="ROBOTS" CONTENT="NOINDEX, FOLLOW">
<META NAME="ROBOTS" CONTENT="INDEX, NO FOLLOW">
```

<META NAME="ROBOTS" CONTENT="INDEX, FOLLOW">

INDEX and NOINDEX indicate to all agents whether or not the file should be indexed by that agent. FOLLOW and NOFOLLOW indicate to all agents whether or not they should spider hyperlinks in this document.

For current internet search engines, the present invention process uses the CGI program(s) provided by the search engine in order to add, modify an remove files from the search engine index. However, the process can generally only remove a file from the search engine index if the file no longer exists or if the site owner (under the direction of the process) has configured the site, through the use of robots.txt, the ROBOTS META tag or other methods of index control, so that the search engine will remove the file from its index.

The duration of time between the first time a site is indexed and the next time that information is updated has led to several key problems:

A. A resource that is modified or removed by its owner after it is indexed by a search engine could be incorrectly listed in that search engine for months until an agent visits the site to register the change.

B. A resource may be modified since that last time it was indexed, in which case a user may never be directed to the new content, or incorrectly directed to content that is no longer present.

C. Deleted resources can create the impression for a search engine user that a whole web site has shut down, that the information the user is looking for is removed, or that the web site is not being maintained, when the resources may have simply been moved to another location on the site as part of regular site maintenance.

D. Automated tools such as search engines apply their own criteria in order to determine the relevancy of a particular resource for a particular query. These automated criteria can lead to the search engine returning spurious, misleading, or irrelevant results to a particular query. For example, a recent search for the nursery rhyme "Rub a dub dub, three men in a tub" on a particular search engine resulted in the top ten search results containing discussions of various issues among consenting males.

E. Automated agents are not always able to understand the context of the pages they index, as illustrated by the example above. As such, their one-dimensional capabilities allow web masters to create the impression that the resources on a particular site contain information they do not. This is done to direct traffic to sites by providing incorrect or misleading information, a process called spamming.

F. Most automated agents are incapable of processing the content of resources that are binary in nature, such as applications written in the programming language Java. These applications can display text data, but do not use text or HTML files to do so. Instead, the information is encoded in binary form in the application. As such, an agent cannot determine the content of a resource coded in this manner.

The present invention provides a mechanism for search engine and web site managers to maintain as perfect a registration of web site content as is possible. By augmenting or replacing existing agents and manual registration methods with specialized tools on the local web site (and, when feasible, at the search engine), the current problems with search engine registration and integrity can be eliminated.

SUMMARY OF THE INVENTION

The present invention defeats the key problems with automated agents and manual registration and replaces them with an exception based, distributed processing system. Instead of making the search engine do all the work necessary to index a site, the web site owner is now responsible for that operation. By distributing the work, the search engine is improved in these ways:

1. The search engine can maintain perfect ongoing registration and indexing of pages by re-indexing at a set interval, as frequently as the web site owner chooses.
2. The search engine can maintain an intelligent database, not limited by the conditions that automated agents have imposed on them and not easily corruptible by web site owners with less ethical practices.
3. The search engine provides a guarantee of integrity to all users, ultimately providing a more valuable service to both users and web site owners.

The process is begun by distributing a set of search engine update software tools to the web site owner. These tools can be implemented in one of three ways. The first way is to implement the tools on the web server of the site owner. The software can run automatically, having direct access to all resources on the web site. The second way is to install the software tools on a surrogate server. This surrogate is a computer with proper permissions and access to the resources of the web site and automatically accesses those resources over the network. The third way is through the use of client-side tools. The software will run on each client's computer, check the client's web server via internet protocols, and relay the information on the web server to the search engine.

The software could be written in a variety of different programming languages and would be applicable for as many client and server computers as needed.

Upon initial execution, the software builds a database of the resources on the web site. The resources catalogued can be specified by the user, or automatically through spidering functions of the software. The database consists of one record per resource indexed on the site. Each record contains fields including:

A. The search engines the owner of the web site would like the resource to be indexed by.

B. The date and time of the last index by each search engine.

C. The date and time a resource was last modified according to the local indexing engine.

D. Flags to indicate whether a specific resource requires updating, inclusion, or removal from a particular search engine database.

Upon each subsequent execution the software tools inspect the current state of the web site against the content of the database. When altered, removed, or additional content is found, the software tools make the appropriate changes to the database and then notify the search engine of those changes (see FIG. 1, Box206a, 207b–c). Changes to the database are made as follows:

A. A resource is marked as deleted if the resource is listed in the current database, but cannot be retrieved.

B. A resource is marked as modified if the date and time of last modification in the current database is earlier than the date and time of last modification provided by the web server for the resource.

C. A resource is added and marked as added if it is present on the web server, but not yet in the database and the web site manager has opted to add it either manually or automatically.

Through application of the present invention, the following improvements are made in search engine administration:

1. The task of spidering the web site has been distributed to the web site owner (see FIG. 1, Box 205c).
2. The web site owner has the capability to protect brand image from being injured by a search engine pointing potential visitors to deleted, irrelevant, or incorrect resource information.
3. The search engine owner has a higher degree of database integrity. Less information storage space is wasted on spurious, nonexistent or incorrect data.
4. The web site owner can directly indicate the keywords and other descriptions that are most appropriate for each resource in the site, as opposed to using the cumbersome HTML 'Meta' tag to specify the keywords for the agent. Keywords are words that are particularly relevant to a particular resource and might be used on a search engine to locate that resource.
5. The search engine can create a reverse index of keywords that the individual site owners have identified for each resource. For example, a user could query for a list of all web sites that have listed 'dog' as an appropriate keyword.
6. The internet search engine could be used by users to query the content of a particular web site, as opposed to requiring a web site based search engine to index the content. This saves administration effort and computing resources at the web site.

The main aspect of the present invention is to provide a method to index locally at a web site all changes to that site's resource content database which has occurred since the last search engine indexing.

Another aspect of the present invention is to actively transmit said changes to an internet search engine.

Another aspect of the present invention is to automatically transmit batches of updates (a list of content that has changed since the last search engine index), in a predetermined manner.

Other objects of this invention will appear from the following description and appended claims, reference being had to the accompanying drawings forming a part of this specification wherein like reference characters designate corresponding parts in the several views.

Figure 1A:
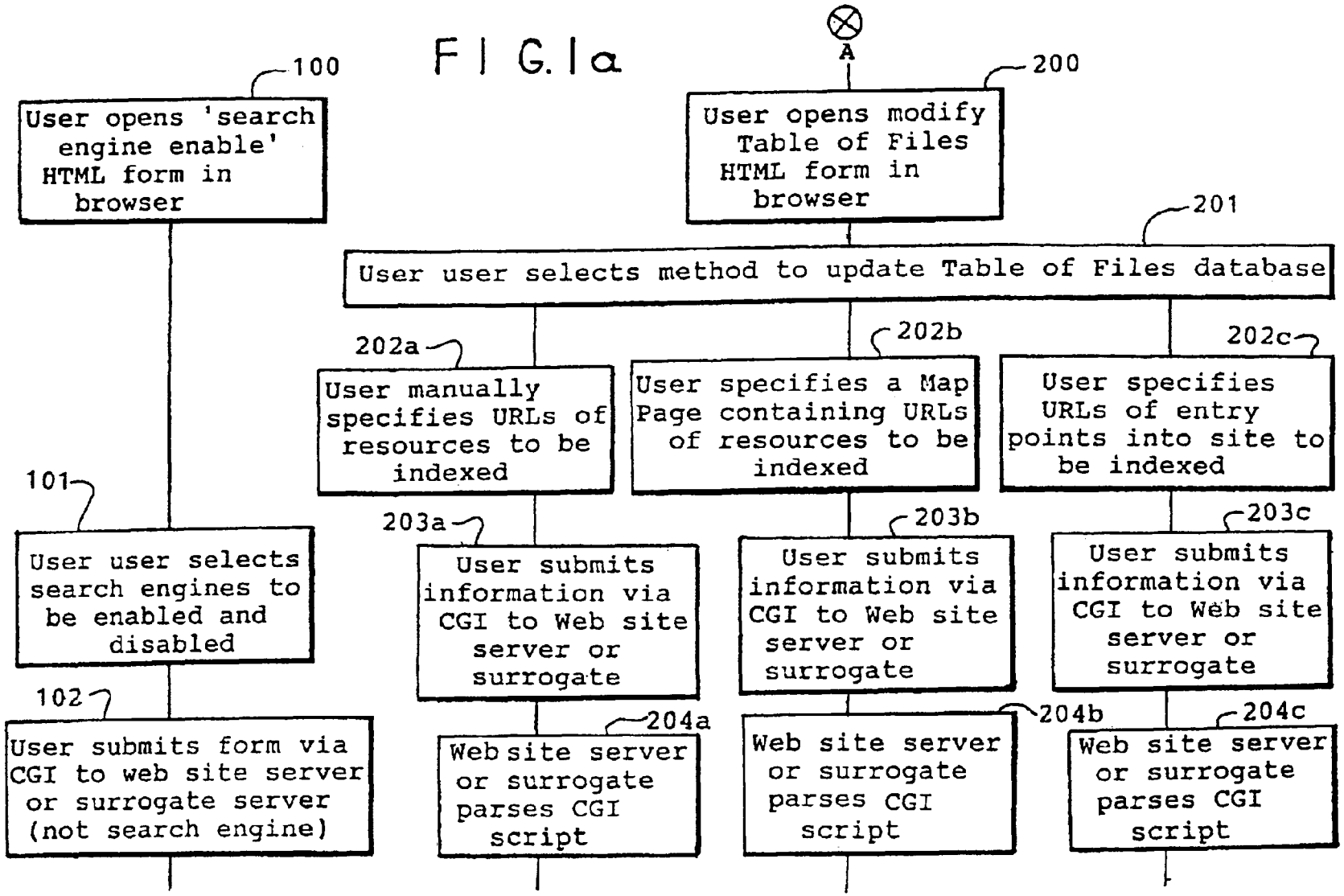
FIG. 1 is a flowchart of the steps to select which search engines will receive updates and which files shall be updated on those search engines

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

The present invention can be used on new Internet search engine systems, or existing systems can be adapted for use by existing search engines having the following characteristics:

1. The search engine provides a Common Gateway Interface to allow resources to be added to, modified, or deleted from the search engine database.
2. The search engine can update the database index quickly (ideally immediately) in response to additions, modifications, or deletions information provided through the CGI.
3. The search engine can keep the date and time it last indexed a page (or alternatively, the last modification date and time of the page when it was last indexed) and can make this information available to the web site owner.

In addition, if a search engine allows search results to be constrained to one particular site, that completes the functionality requirements of the present invention.

The technical effort required to apply the present invention to existing Internet search engines is similar to that required to apply the invention to a new search engine. The most complex instance would be to apply the invention to a range of search engines, some of which have been designed with the invention in mind, some of which have not. The aforementioned instance will be assumed here.

As implemented, the invention is a server-side process, running either on a surrogate server or the actual server upon which the web site is stored. The process is coded as a program in the Perl programming language, although other languages such as C++ or Java could be used. The process is invoked regularly by the operating system of the computer on which the program resides or manually by a web site manager.

As such, there are three main areas of the preferred embodiment that need to be understood. They are:

I. The implementation and construction of the server side tools, which consist of the database and tools to update the database.

II. The process by which the database is constructed and updated.

III. The process by which a search engine is updated by a site using this process.

I. The Implementation and Construction of the Server Side Tools, Which Consist of the Database and Tools to Update the Database Installation of the software tools places a number of CGI scripts, database tables, and HTML forms on the server. Each element performs a specific function relevant to the process and is outlined below. Initially, there is a database Table of Search Engines, containing an entry for each Internet search engine. The table below illustrates the format of a typical search engine record.

| Field | Type | Default | Description |
|---|---|---|---|
| Name | String | None | The name of the search engine |
| Enabled | Boolean | True | Whether the search engine is to be informed of changes to content |
| Table of Files | Table | None | Database table of files indexed on this site and for which changes must be tracked |
| Register by default | Boolean | True | Whether to register a resource on this search engine in the absence of explicit information provided by the site manager |

-continued

| Field | Type | Default | Description |
|---|---|---|---|
| Max registrations | Integer | None | The maximum number of registrations allowed per day by this search engine |
| Limit to site | Boolean | None | Whether the search engine allows searches to be restricted to one web site only |
| Lists index date | Boolean | None | Whether the search engine will report the date a resource was last indexed |
| Lists index time | Boolean | None | Whether the search engine will report the time a resource was last indexed |
| Index time | Integer | None | Typical delay between registration time and indexing of a site by the search engine |
| Supports file lookup | Boolean | None | Whether the search engine will allow a particular file to be searched for |

The user is provided with an HTML form and CGI script, hereinafter referred to as a CGI program, in order to configure the Enabled and Table of Files fields (see FIG. 1, Box 100–101). The information the user inputs is submitted over the Common Gateway Interface (FIG. 1, Box 102) and the referenced CGI script updates the database tables as instructed (FIG. 1, Box 103–105). The user can thus enable (i.e., select) and disable a particular search engine using this interface. A search engine that is disabled in the database is simply skipped during an update.

The Table of Files is a field in the Table of Search Engines database. It is initially configured by the user through a CGI program (FIG. 1, Box 200) to list the files the user wishes to be registered with this search engine. This table contains a record for each resource. Each record contains the following fields:

| Field | Type | Default | Description |
|---|---|---|---|
| Name | String | None | The URL of the resource |
| To Be Registered | Boolean | False | Whether the resource needs to be registered with this search engine |
| To Be Un-registered | Boolean | False | Whether the resource needs to be unregistered (removed) from this search engine |
| Date and time last registered | Date and Time | None | Date and time the file was last registered with the search engine |
| Register | Enum (True, False, By default) | By default | Whether the site manager wants the file to be registered on this search engine. The 'By default' value indicates to follow the value of the 'Register by default' field of the search engine record of the database |

The Table of Files is a list of the above records. The list is built by first obtaining the set of resources the user wishes to maintain and register with a search engine (FIG. 1, Box 201). The user enters the files they wish to monitor into a CGI program and submits the form (FIG. 1, Box 203a–c, Box 204a—c). The form allows the user to choose from many methods of building the Table of Files. These methods include, but are not limited to:

A. The user may list all the resources to be registered manually. These listed resources are added to the Table of Files (FIG. 1, Box 202a, 205a).

B. The user may specify a map page. If the user specifies a map page, this map page is retrieved. All of the hyperlinked resources on the map page referring to this web site are added to the Table of Files (FIG. 1, Box 202b, 205b, 206b).

C. The user may specify entry points to the web site. If the user specifies entry points, the CGI program will enter the site and spider to all resources referenced on those entry points, adding those resources to the Table of Files (FIG. 1, Box 202c, 205c, 207c).

The list of pages built by the above process forms the Name fields of the Table of Files records for each search engine. This process can be performed globally (on all search engines in the table of search engines), on a group of search engines or on an individual search engine, as indicated by the user (FIG. 1, Box 206a, 207b, 207c).

Submitting the above form also invokes a CGI script to set the Enabled and 'Register by default' fields of the appropriate search engine record according to the preferences of the user. Additionally, a page is provided where the title, URL and Meta Description of each page would be substituted in the appropriate place in the table for each search engine.

Submitting this additional information invokes a CGI script to set the Register field of the Table of Files field for the appropriate search engine record, according to preferences of the user.

IIV. The Process by Which the Database is Constructed and Updated

The process now looks up each file and determines whether the file is registered, current, out of date, or deleted with respect to its registration on the search engine.

There are eight possible states for the file to be in with respect to its registration. In order for the process to be deterministic, all random spidering activity by the search engine is ignored in determining the state of the file. The state is determined purely by the current registration and the data the process has stored in the database of activities performed by previous invocations of itself.

Figure 2A:
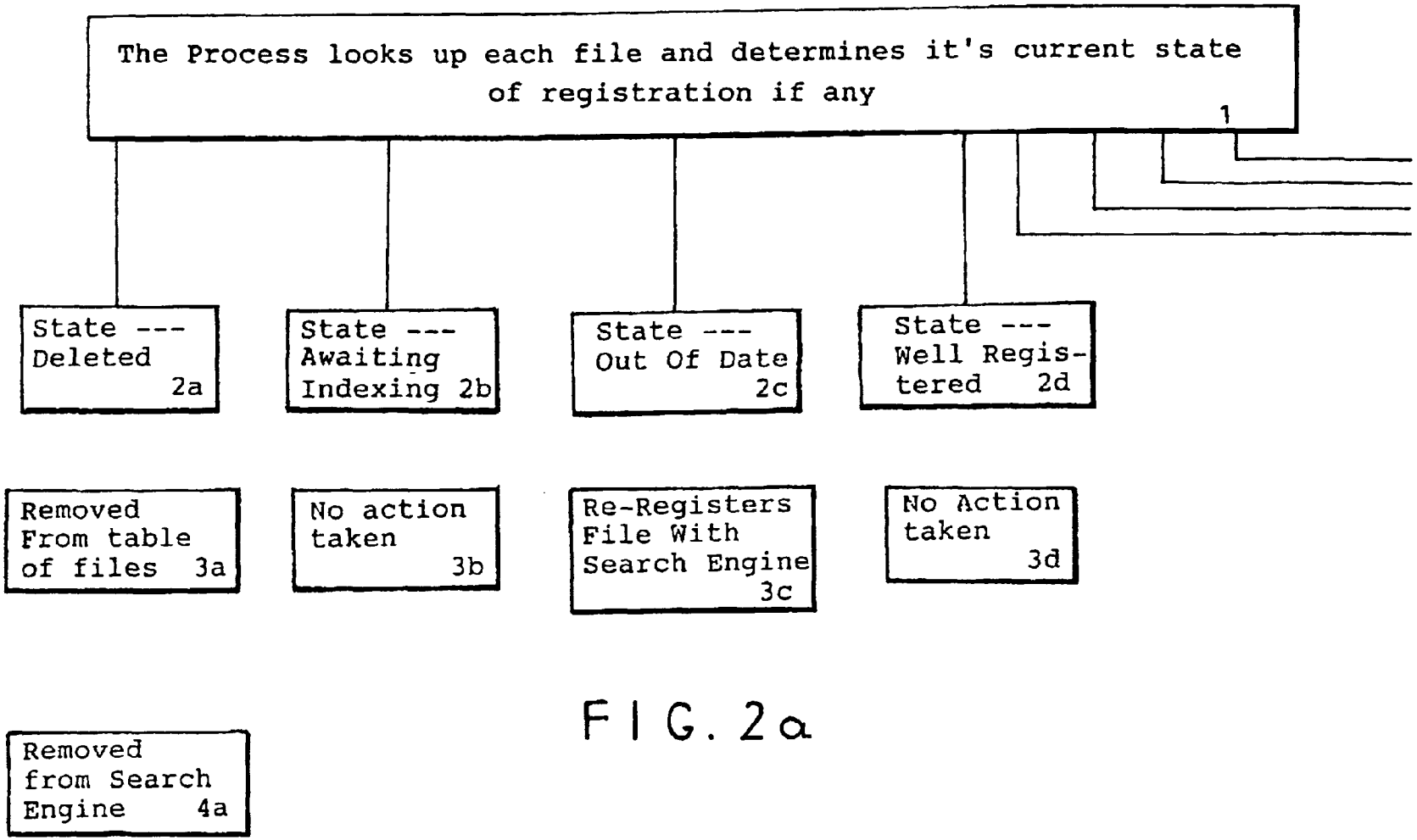
FIG. 2 is a diagram of the decision tree for determining the state of a specific resource on a particular search engine database, and the action needed to update the internet search engine as enabled in FIG. 1.
Figure 2B:
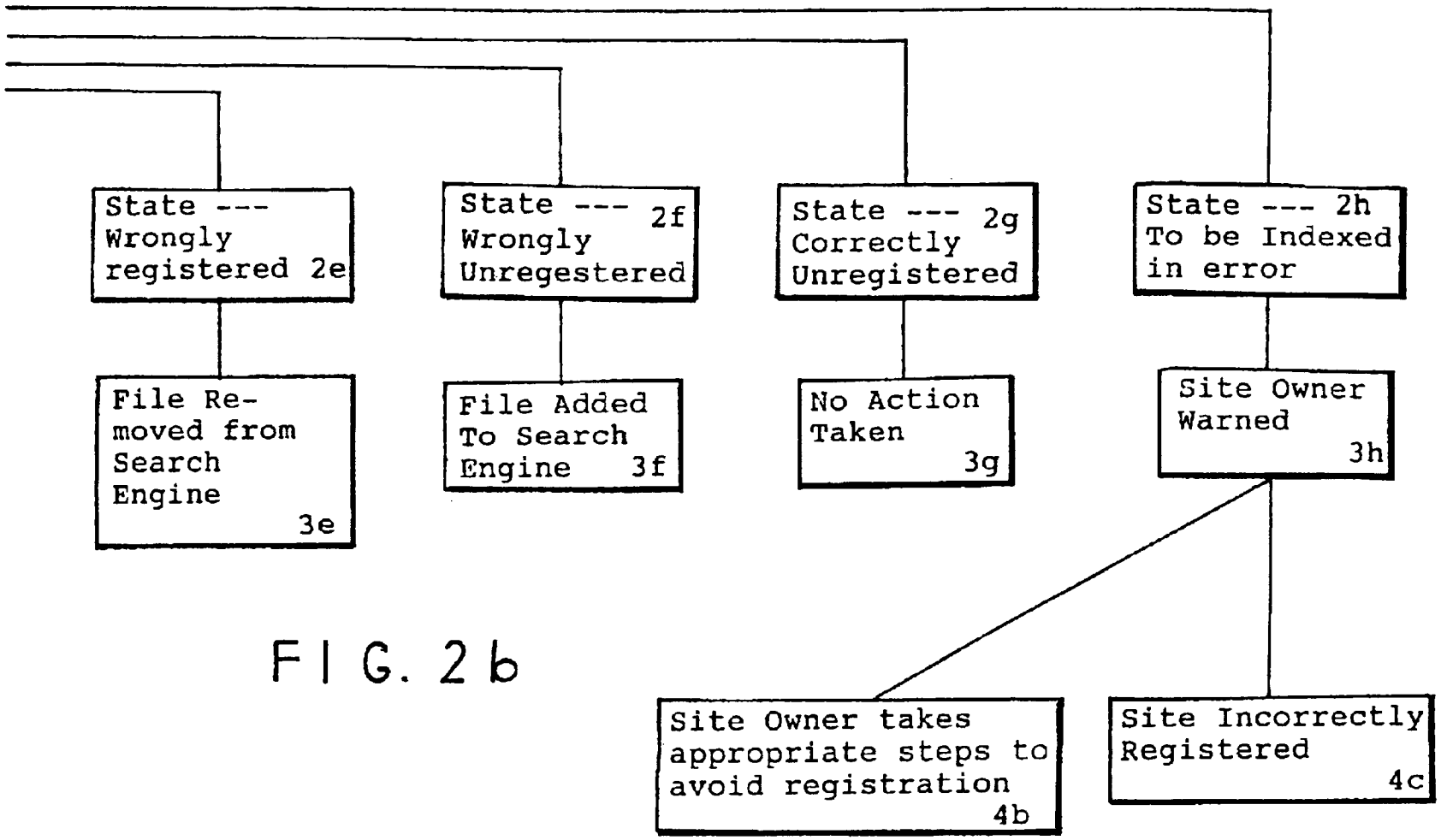

FIG. 2 illustrates the decision process to determine the state of a resource on the search engine (Box 1) and the action, which must be taken. A resource can be in the following states:

| | |
|---|---|
| Deleted (2a) | The resource no longer exists on the web site. If the resource exists in the search engine database, an error is signaled. |
| Awaiting indexing (2b) | The resource is not in state 2a. The resource should shortly be indexed by the search engine and should not be registered now. |
| Out of date (2c) | The resource is not in state 2a, 2b . . . The resource is not due to be indexed by the search engine, but has been modified since it was last indexed by the search engine. |
| Well registered (2d) | The resource is not in state 2a, 2b, 2c. The resource has not been modified since last indexed and its listing on the search engine is correct. |
| Wrongly registered (2e) | The resource is not in state 2a, 2b, 2c, 2d. The resource is listed on the search engine, but the web site manager does not want it to be. |
| Wrongly unregistered (2f) | The resource is not in state 2a, 2b, 2c, 2d, 2e. The web site manager wishes the resource to be registered by the search engine, but the resource is not registered by the search engine or due to be indexed by the search engine. |
| Correctly unregistered (2g) | The resource is not in state 2a, 2b, 2c, 2d, 2e, 2f. The resource is not registered, not due to be indexed, and the user does not wish it to be. |
| Will be indexed in error (2h) | The resource is not in state 2a, 2b, 2c, 2d, 2e, 2f, or 2g. The resource is not listed by the search engine and the site manager does not wish it to be. However, the file will shortly be indexed by the search engine and the site configuration currently would not prevent this. |

The following are the actions to be taken in each state (see FIG. 2):

| | |
|---|---|
| Deleted (3a) | The resource no longer exists on the web site. The process attempts to remove the resource entry from the search engine database with a CGI program provided by the engine for this purpose (4a). |
| Awaiting indexing (3b) | No action is taken. |
| Out of date (3c) | The resource has been modified since it was last indexed by the search engine. The process attempts to register the resource for re-indexing with CGI program provided by the engine for this purpose. |
| Well registered (3d) | No action is taken. |
| Wrongly registered (3e) | The process attempts to remove the resource entry from the search engine index using a CGI program provided by the search engine for this purpose. |
| Wrongly unregistered (3f) | The process attempts to add the resource to the search engine index using a CGI program provided by the search engine for this purpose. |
| Correctly unregistered (3g) | No action is taken. |
| Will be indexed in error (3h) | The web site manager is warned through the process reporting mechanism (e-mail, a web page, or other method) that the manager does not want the resource to be indexed, but the search engine will shortly index it and there are no safeguards in place to prevent this. Site manager can take appropriate steps to avoid registration (4b) or registration will take place (4c). |

The following psuedo code indicates the necessary steps in programming which must be taken determine the state of a resource and take the appropriate action.

```
For each enabled search engine in DatabaseLookup(table of
                                                    search engines)
  list of files = search engine table of files
  If search engine.limit to site
    search engine files = SearchEngineLookup(all files
                                  reported by search engine for this site)
      list of files = list of files + search engine files
  End if
  For each file in list of files
    last index date time = GetIndexDateTime(file, search engine)
    If FileExists(file, list of files)
      If search engine.table of files.file.toberegistered
          RegisterFile(file, search engine)
          Next For [each file in list of files]
      End if
      last modification date time =
        GetLastModificationDateTime(file)
      will be indexed = WillBeIndexed(file, search engine,
        last index date time)
      should be registered = ShouldBeRegistered(file,
        search engine)
      If last index date time != not found
          If should be registered
            If last modification date time >
              last index date time
                If will be indexed
                  AddReport("awaiting
                    indexing", file)
                Else
                  AddReport("out of date",
                    file)
                  RegisterFile(file,
                    search engine)
                End if
            Else
                AddReport("well registered"",
                  file)
            End if
```

-continued

```
            Else [File is registered but should not be]
              AddReport("wrongly registered", file)
              UnRegisterFile(file)
            End if
        Else [File is not registered]
            If should be registered
              AddReport("correctly unregistered", file)
              RegisterFile(file, search engine)
            Else
              If will be indexed
                  AddReport("will be indexed in error",
                    file)
              Else
                  AddReport("well unregistered",
                    file)
              End if
            End if
        End if
      Else [File Does not exist]
        AddReport("deleted", file)
        If last index date time != not found
            UnRegisterFile(file, search engine)
        End if
      End if [File Exists]
  End For
End For
```

Figure 3A:
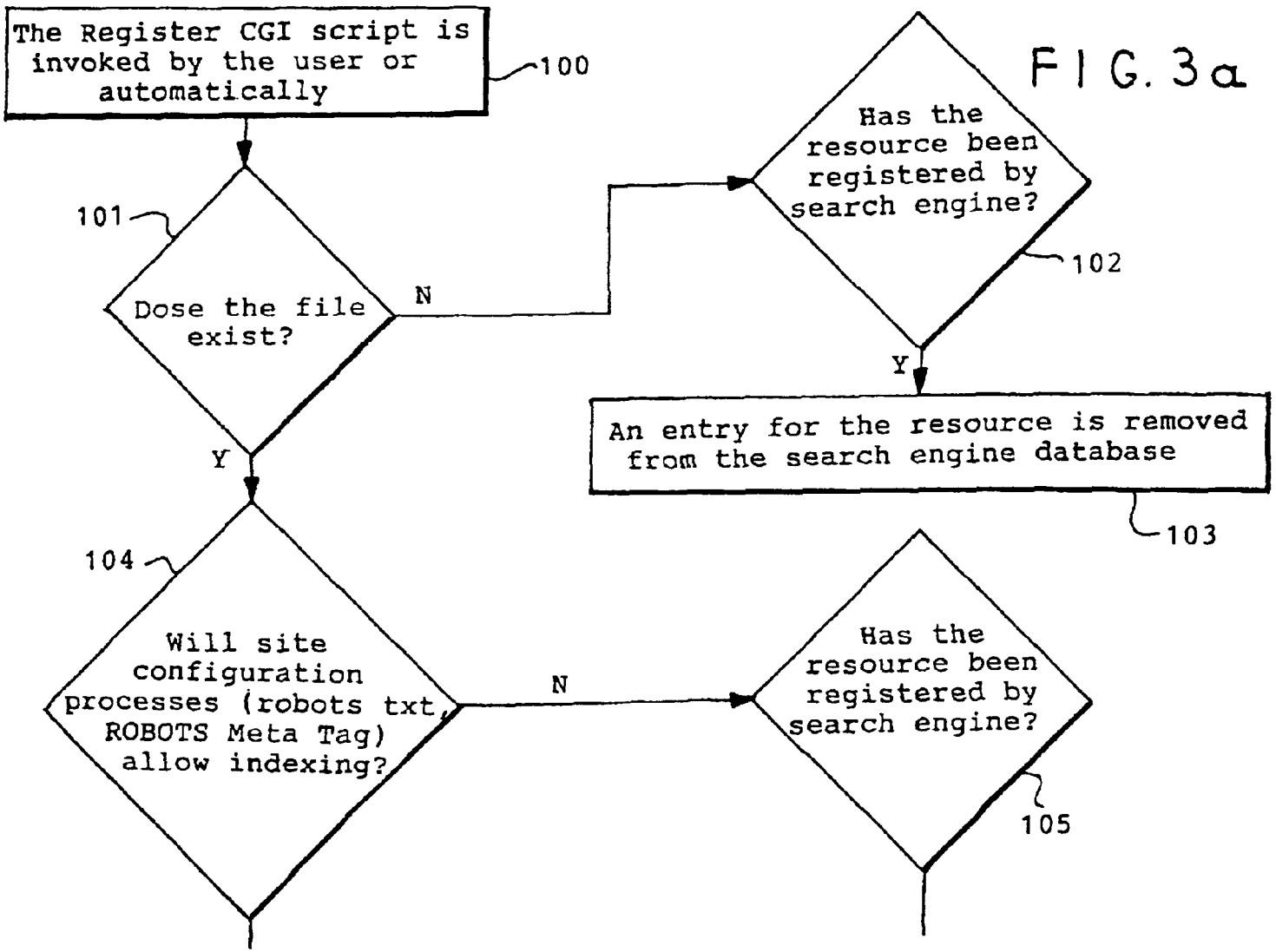
FIG. 3 is a diagram of the Internet search engine update process of updating the files as in FIG. 1 and resources defined by FIG. 2.
Figure 3B:
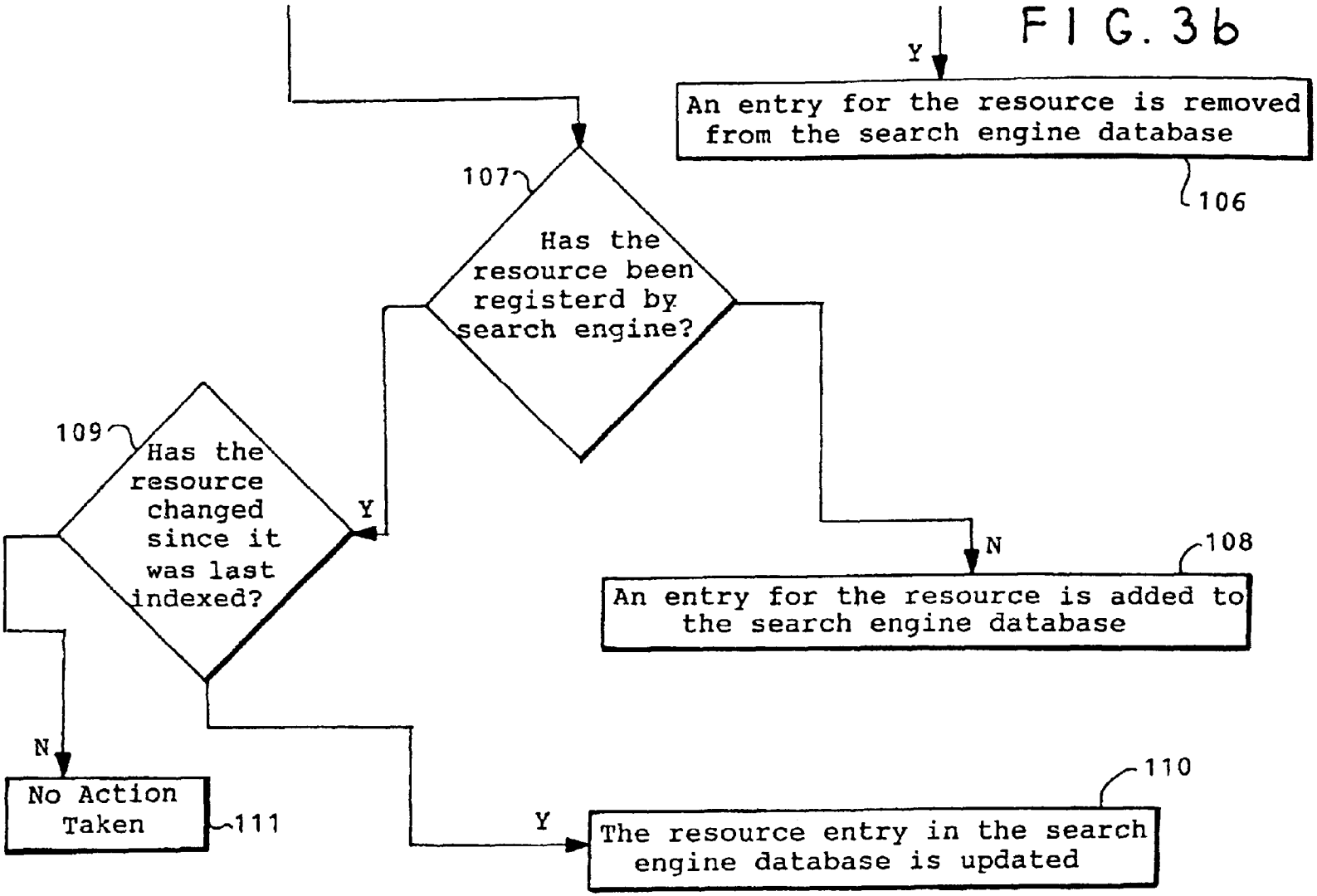

III. The Process by Which a Search Engine is Updated by a Web Site Using This Process There are three ways the process may update a search engine:

1. It can register a resource in an attempt to have that file added to the search engine database (FIG. 3, Box 104).
2. It can register a resource in an attempt to update the resource's listing in the search engine database (FIG. 3, Box 105).
3. It can unregister a resource in an attempt to remove the file from the search engine index (FIG. 3, Box 103).

In practice, these three activities are usually performed by the same CGI program on current search engines. This CGI program is the 'register file' program and is run manually by the user of automatically (FIG. 3, Box 100). An HTML form is provided for the purpose of adding a resource to the search engine index. On submitting the form, a CGI script is invoked. The most common mode of action for this script is as follows:

1. If the file exists (FIG. 3, Box 101), the search engine determines whether the configuration of the web site will allow indexing through robots.txt and/or ROBOTS Meta Tag (FIG. 3, Box 104). If the file does not exist and the file has been registered by the search engine (FIG. 3, Box 101, 102), it is removed immediately from the search engine database index (FIG. 3, Box 103).
2. If the site can be indexed, the search engine determines if the resource is registered by the search engine. If the resource is registered, the search engine determines if the resource has changed since it was last indexed (FIG. 3, Box 109). If the resource has changed since it was last indexed, the resource entry in the search engine database is updated with new data (FIG. 3, Box 109, 110). If the resource has not changed since it was last indexed, then no action is taken. (FIG. 3, Box 111). If the site can not be indexed, and the resource has been indexed by the search engine (FIG. 3, Box 105), the entry for the resource is removed from the search engine database (FIG. 3, Box 106).
3. In a case where the site can be indexed and the resource does not exist in the search engine database, the resource URL is added to a list of URLs the search engine will index (FIG. 3, Box 108). Some search engines will index resources submitted in this way within a day or two of submission. Other search engines may take weeks or months.

The Following Pseudo Code Illustrates the Above Processes:

```
On RegisterFile(file, search engine)
    Check that the file is appropriate for the search engine
    If file is appropriate or IsRegistered(file, search engine)
        If file is not appropriate
            AddReport("inappropriate file registered", file)
        End if
        If!(file in DatabaseLookup(search engine, table of files))
            AddFileToDatabase(search engine, file)
        End if
        If SearchEngineRegistrationsOK(file, search engine)
            SearchEngineRegisterFile(file)
            If file registered OK
                search engine.table of files.file.date last
                    registered = todays's date
                search engine.table of files.file.time last
                    registered = now
                AddReport("file registered", file)
                search engine.table of files
                    file.toberegistered = false
            Else
                AddReport("Registration failed", file)
                search engine.table of files
                    file.toberegistered = true
            End if
        Else
            AddReport("registration delayed", file)
            search engine.table of files.file.
                toberegistered = true
        End if
    Else
        AddReport("registration failed - inappropriate file", file)
    End if
End RegisterFile
On UnRegisterFile(file, search engine)
    SearchEngineUnRegisterFile(file)
    If file unregistered OK
        AddReport("file unregistered", file)
        search engine.table of files.file.tobeunregistered = false
    Else
        AddReport("Unregistration failed", file)
        search engine.table of files.file.tobeunregistered = true
    End if
End UnRegisterFile
```

The present invention would:

1. Significantly improve the quality of a sites registration on a range of search engines. Out of date registrations and registrations pointing at deleted files would be quickly cleaned up. Unregistered files that the site owner wanted registered would be quickly registered, and currently indexed files that the site owner wanted removed from the index would quickly be removed. Registration would always be within the rules of each search engine to which the process was applied.
2. Provide a new method for search engines to gather and distribute information. The process works best when the search engine and site owner cooperate for mutual benefit. The search engine should offer the following features in order for the process to work most efficiently:
   a. Provide confirmation that a particular file is in the index.
   b. Provide the date and time the file was indexed or guarantee immediate indexing
   c. Provide the current date and time according to the search engine index
   d. Provide a means to add a file to the index (ideally immediately)
   e. Provide a means of removing a file from the index (ideally immediately)
   f. Impose no practical limit on the number of files that may be registered within a fixed period
   g. Provide a means of restricting searches to a particular site through a hidden field in the search CGI, the state of which is maintained on each page delivered by the search engine. Once a site has a perfect ongoing registration on a powerful search engine, that search engine is perfect for searches within that site.

The following functions are describe further the above processes.

```
On DatabaseLookup(table of search engines)
  return table of search engines
End DatabaseLookup(table of search engines)
On DatabaseLookup(search engine, table of files)
  return table of files(search engine)
End DatabaseLookup(search engine, table of files)
On AddFileToDatabase(search engine, file)
  table of files(search engine) += file
End AddFileToDatabase(search engine, file)
On SearchEngineLookup(all files reported by search engine for site)
  list of files = ( )
  page number = 1
  site links = SearchEngineGetPage(search engine, site, page number)
  while number of site links > 0
    list of files += site links
    increment page number
    site links = SearchEngineGetPage(search engine,
                                                    site, page number)
  end while
  return list of files
End SearchEngineLookup(all files reported by search engine for site)
On FileExists(file, list of files)
  If file is local
    Perform stat of file
    return stat.exists
  else
    Perform HTTP head request of file
    If head request indicates that file exists
      Return file exists
    else
      Return file not exists
    end if
  end if
End FileExists(file)
OnGetLastModificationDate(file)
  If file is local
    Perform stat of file
    return stat.LastModificationDate
  else
    Perform HTTP head request of file
    return response.LastModifiedDate
  end if
End GetLastModificationDate(file)
On GetIndexDateTime(file, search engine)
  If search engine.lists index date
    If search engine supports file lookup
      If(!LookupFile(search engine, file))
        last index date time = not found
      Else
        last index date time = lookup.date
        If search engine.lists index time
          last index date time += lookup.time
        End if
      End if
    Else
      last index date time = not found
      For each phrase in file
        While GetNextSearchEnginePage(search engine,
                                                    phrase)
          If search engine page lists file
            last index date time =
```

-continued

```
                                                    searchpage.file.date
            If search engine.lists index time
              last index date time +=
                                                              lookup.time
            End if
            Exit For [each phrase in file]
          End if
        End While
      End For
    End if
    If last index date time!= not found
      Translate last index date time to server time
    End if
    return last index date time
  Else
    If file.date and time last registered is set
        return file.date and time last registered +
                                          search engine.index time
    End If
    return not found
  End If
End GetIndexDateTime(search engine, file)
On WillBeIndexed(file, search engine, last index date time)
  If file.date and time last registered is set
    If last index date time > file.date and time last
                                                          registered
      return false
    End if
    predicted index date time = file.date and
                        time last registered + search engine.index time
    return (predicted index date time > today now)
  Else
    return false
  End If
End
On ShouldBeRegistered(file, search engine)
  If search engine supports ROBOTS tag
    If file contains ROBOTS tag
      return !(ROBOTS tag contains NOINDEX)
    End If
  End if
  If search engine supports robots.txt file
    If site has robots.txt file
      return !(file excluded by robots.txt)
    End if
  End if
  return search engine.register by default
End ShouldBeRegistered(file, search engine)
on AddReport(descriptive text, file)
  set report = report + file + descriptive text
end
```

Additionally, proxy files could be used in place of any other files. This could be achieved simply by extending the FILE RECORD with a proxy filename, as follows:

| Field | Type | Format | Description |
|---|---|---|---|
| Proxy | String | None | The location of the proxy for the file |

Whenever the process registers a resource with the search engine, it could deliver the proxy to the search engine in place of the resource itself. The format of the proxy file could be plain text, or HTML to allow current indexing techniques to continue to work. The format of the proxy file could also be any other markup language, for instance XML. The principle remains the same a text file is used in place of any other file or set of files. This method will allow, for example, Java, embedded objects, graphics, frames, and other file formats to be indexed.

Spamming is a potential problem when using proxy files. The idea of the proxy file is that the search engine uses it to create an index, but the search engine user links to the real file in response to a search query. Clearly, if the contents of the proxy file and the real file do not match, the user will not get what they are expecting. For example, a rogue site owner may set up the proxy file to catch a lot of queries about sex (the most searched for term on the Internet), when in fact their page is trying to persuade you to join their online gambling syndicate.

Spamming will only occur when there is a breakdown of trust between the site owner and search engine owner. The site owners could sign an online contract to guarantee that they will not spam. By signing the contract, they are provided with the embodiment of the process in order to register and maintain their registration with the search engine. If, through spamming, the contract is broken, the search engine can discontinue listing pages temporarily or permanently for the web site in question. It may also be able to take legal action. There are also programmable and scalable methods of defeating spamming—they are irrelevant to this discussion.

It is important to emphasize that web site owners do not have to use the tools provided for their sites to be registered. The search engine can still spider sites whose owners do not use the tools provided, in the same way as conventional search engines spider sites. For sites that are deemed appropriate, the search engine can even set up a surrogate server to implement the present invention on behalf of a non-participating site owner. The present invention is not limited in its application to the details of the particular arrangement shown, since the invention is capable of other embodiments. Also, the terminology used herein is for the purpose of description and not of limitation.

I claim:

1. A method to update an internet search engine database with current content from a web site, comprising the step of:

creating and modifying a database of a web site wherein said website database contains content capable of being indexed by an internet search engine;

identifying, using said web site database, new, deleted, unmodified or modified content;

transmitting to said internet search engine a set of indices, wherein said set of indices comprises said new, deleted, [unmodified] or modified database content;

opening, by a user, a form on a computer to enable or disable internet search engines to be updated with information;

enabling or disabling, by said user, the appropriate internet search engines on said form;

submitting, by said user, said information to a script;

parsing, through the use of said script, said information from said form; and updating, through the use of said script, said database of search engine.

2. The method of claim 1, wherein said web site database further comprises a database having one record per resource indexed on said web site.

3. The method of claim 2, wherein said one record contains fields including:

a. search engines by which the owner of the web site would like the page to be indexed, b. a date and time of the last index by search engine, c. a date and time a page was last modified according to the local indexing engine, and d. flags to indicate whether a specific resource requires updating, inclusion or removal from a particular search engine database.

4. The method of claim 2, wherein said content of said web site database further comprises:

a proxy file field referencing a proxy file containing a description of said resource;

wherein said transmitting means further comprises a means for transmitting said proxy file to said internet search engine; and said proxy file is used in lieu of new or modified content of said web site database.

5. The method of claim 1, wherein said form is an HTML form, said script is a CGI script and said page is an HTML page.

6. The method of claim 1, further comprising the steps of:

a. implementing a form to specify web resources a web site manager wishes the process to manage;

b. submitting said form to a script on web server or said surrogate server;

c. parsing, through the use of a script, said new information from said form; and d. creating a table of files, contained in said search engine database, via said script.

7. The method of claim 6, wherein said form is an HTML form, said script is a CGI script and said web resource is a WWW resource.

8. An apparatus for updating an internet search engine database with current content from a web site, comprising:

a means for creating and modifying a database of a web site wherein said website database contains content capable of being indexed by an internet search engine;

a means for identifying, using said web site database, new, deleted, [unmodified] or modified content;

a means for transmitting to said internet search engine a set of indices, wherein said set of indices comprises said new, deleted, unmodified or modified database content;

a means for opening, by a user, a form on a computer to enable or disable internet search engines to be updated with information;

a means for enabling or disabling, by said user, the appropriate internet search engines on said form;

a means for submitting, by said user, said information to a script;

a means for parsing, through the user of said script, said information from said form; and a means for updating, through the use of said script, said database of search engine.

9. The apparatus of claim 8, wherein said web site database further comprises a database having one record per resource indexed on said web site.

10. The apparatus of claim 9, wherein said one record contains fields including:

a. search engines by which the owner of the web site would like the page to be indexed, b. a date and time of the last index by search engine, c. a date and time a page was last modified according to the local indexing engine, and d. flags to indicate whether a specific resource requires updating, inclusion or removal from a particular search engine database.

11. The apparatus of claim 9, wherein said content of said web site database further comprises:

a proxy file field referencing a proxy file containing a description of said resource;

wherein said transmitting means further comprises a means for transmitting said proxy file to said internet search engine; and said proxy file is used in lieu of new or modified content of said web site database.

12. The apparatus of claim 8, wherein said form is an HTML form, said script is a CGI script and said page is an HTML page.

13. The apparatus of claim 8, further comprising:

a. a means for implementing a form to specify web resources a web site manager wishes the process to manage;

b. a means for submitting said form to a script on web server or said surrogate server;

c. a means for parsing, through the use of a script, said new information from said form; and d. a means for creating a table of files, contained in said search engine database, via said script.

14. The apparatus of claim 13, wherein said form is an HTML form, said script is a CGI script and said web resource is a WWW resource.

* * * * *

UNITED STATES PATENT AND TRADEMARK OFFICE

CERTIFICATE OF CORRECTION

PATENT NO. : RE 40,683 E
APPLICATION NO. : 10/600114
DATED : March 24, 2009
INVENTOR(S) : Alan Perkins It is certified that error appears in the above-identified patent and that said Letters Patent is hereby corrected as shown below:

In column 14, Claim 1, line 7, delete “unmodified” and insert -- [unmodified] --.

In column 15, Claim 8, line 10, delete “unmodified” and insert -- [unmodified] --.

Signed and Sealed this

Fifth Day of May, 2009

John Doll

JOHN DOLL
*Acting Director of the United States Patent and Trademark Office*

UNITED STATES PATENT AND TRADEMARK OFFICE

CERTIFICATE OF CORRECTION

PATENT NO. : RE40,683 E
APPLICATION NO. : 10/600114
DATED : March 24, 2009
INVENTOR(S) : Alan Perkins It is certified that error appears in the above-identified patent and that said Letters Patent is hereby corrected as shown below:

In column 16, line 1, change “user” to --use--.

Signed and Sealed this
Eleventh Day of October, 2011

David J. Kappos

David J. Kappos
*Director of the United States Patent and Trademark Office*